United States Patent
Mauermann (10) Patent No.: US 7,143,523 B2
(45) Date of Patent: Dec. 5, 2006

(54) SECURING DEVICE FOR TRANSPORTING AND MOUNTING A MEASURING ARRANGEMENT

(75) Inventor: Christian Mauermann, Traunstein (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 66 days.

(21) Appl. No.: 10/958,599

(22) Filed: Oct. 5, 2004

(65) Prior Publication Data

US 2005/0076527 A1    Apr. 14, 2005

(30) Foreign Application Priority Data

Oct. 10, 2003    (DE)    ................. 103 47 965

(51) Int. Cl.
*G01B 11/02*    (2006.01)
(52) U.S. Cl. ........................................... 33/706
(58) Field of Classification Search ............... 33/702, 33/706, 707, 708
See application file for complete search history.

(56) References Cited

U.S. PATENT DOCUMENTS

| | | | |
|---|---|---|---|
| 4,631,830 A * | 12/1986 | Rieder et al. | 33/707 |
| 5,258,931 A * | 11/1993 | Hassler, Jr. | 33/707 |
| 5,987,768 A * | 11/1999 | Freitag et al. | 33/706 |
| 6,415,524 B1 | 7/2002 | Müller et al. | |
| 2002/0124665 A1* | 9/2002 | Tondorf et al. | 33/571 |
| 2004/0020067 A1* | 2/2004 | Matsumoto | 33/706 |
| 2004/0103551 A1* | 6/2004 | Wahl et al. | 33/707 |
| 2004/0261283 A1* | 12/2004 | Falkinger et al. | 33/707 |

FOREIGN PATENT DOCUMENTS

DE    199 18 654 A1    10/2000

* cited by examiner

*Primary Examiner*—G. Bradley Bennett
(74) *Attorney, Agent, or Firm*—Brinks Hofer Gilson & Lione (57) ABSTRACT

A securing device for transporting and mounting a measuring arrangement that includes a linearly extending measuring graduation, a support body for the measuring graduation, a scanning device for scanning the measuring graduation, and a mounting base for fastening the scanning device to one of two components movable with respect to each other. The securing device includes a base body which is longitudinally shifted along a guide track of the support body and which is on the one hand fixable to the mounting base and which is on the other hand fixable to the support body in order to maintain the mounting base in a defined nominal position with respect to the support body and an extended part protruding away from the base body and extending along the measuring graduation in an extension direction. A connector provided on the extended part which can be automatically brought into engagement with a connecting point of the mounting base.

45 Claims, 9 Drawing Sheets

SECURING DEVICE FOR TRANSPORTING AND MOUNTING A MEASURING ARRANGEMENT

Applicant claims, under 35 U.S.C. §119, the benefit of priority of the filing date of Oct. 10, 2003 of a German patent application, copy attached, Serial Number 103 47 965.1, filed on the aforementioned date, the entire contents of which is incorporated herein by reference.

BACKGROUND OF THE INVENTION

1. Field of the Invention

The present invention relates to a securing device for transporting and mounting a measuring arrangement for the determination of the position of two components which are movable with respect to each other, having a linearly extending measuring graduation, a support body for the measuring graduation, a scanning device for scanning the measuring graduation, which is guided at a defined distance from the measuring graduation, and a mounting base for fastening the scanning device to one of the components which are movable with respect to each other, wherein the securing device includes a base body, which can be longitudinally shifted along a guide track of the support body and which can be fastened at one end to the mounting base and on the other end to the support body in order to maintain the mounting base in a defined nominal position with respect to the support body, and wherein an extended part protrudes away from the base body and extends along the measuring graduation. The present invention furthermore relates to a measuring device for determining the position of two components which can be moved with respect to each other.

2. Discussion of Related Art

While transporting and mounting a measuring arrangement having a linearly extending measuring graduation, a support body for the measuring graduation, a scanning device, which scans the measuring graduation and is conducted at a definite distance from the measuring graduation, as well as a mounting base for fastening the scanning device on one of the two components which are movable with respect to each other, such a securing device, is used to fix the scanning device in a defined position (nominal position) with respect to the support body of the measuring arrangement. For this purpose, the securing device is composed of a base body, which can be longitudinally displaced along a guide track of the support body and one side of which can be fastened to the mounting base and the other side to the support body, in order to be able to keep the mounting base in a predeterminable nominal position relative to the support body.

The two components which are movable with respect to each other can in particular be the carriage and the associated base of a machine tool. In this case the support body with the measuring graduation on the one hand, and the mounting base with the scanning device on the other hand can be fastened on respectively one of these two components.

A securing device of the type mentioned at the outset is known from DE 199 18 654 A1, which has two base bodies which are spaced apart from each other in the extension direction of the measuring graduation and are respectively arranged on a front face of the mounting base and are connected via a guide element. Each of the two base bodies can be fixed in place on the support body of the measuring graduation by clamping forces, so that the mounting base can be positioned at a defined position of the support body of the measuring graduation between the two base bodies. In this way a secure bracing of the mounting base on both sides in its nominal position is made possible.

OBJECT AND SUMMARY OF THE INVENTION

An object of the present invention is based on further improving a securing device of the type mentioned at the outset, in particular in view of a simplified positioning of the mounting base on the support body by the securing device.

This object is attained in accordance with the present invention by creating a securing device for transporting and mounting a measuring arrangement for the determination of the position of two components which are movable with respect to each other, the measuring arrangement including a linearly extending measuring graduation, a support body for the measuring graduation, a scanning device for scanning the measuring graduation, which is guided at a defined distance from the measuring graduation, and a mounting base for fastening the scanning device to one of the two components which are movable with respect to each other. The securing device includes a base body which is longitudinally shifted along a guide track of the support body and which is on the one hand fixable to the mounting base and which is on the other hand fixable to the support body in order to maintain the mounting base in a defined nominal position with respect to the support body and an extended part protruding away from the base body and extending along the measuring graduation in an extension direction. A connector provided on the extended part which can be automatically brought into engagement with a connecting point of the mounting base.

In accordance with this, an extended part projects away from the base body of the securing device, which extends along the measuring graduation and on which a connector is provided which, when the base body of the securing device is fixed on the mounting base, can be automatically brought into engagement with an associated connecting point of the mounting base.

The attainment of the object of the present invention makes possible in a single work step, and in particular by the actuation of the securing device at only one point, namely at its base body, a connection of the securing device with the mounting body at two points of the mounting base, which are spaced apart from each other along the extension direction of the measuring graduation, or the displacement direction of the base body, preferably in the vicinity of the two front faces of the mounting base.

For a particularly simple embodiment of the securing device, the extended part is formed as one piece on the base body. However, alternatively the base body and the extended part of the securing device can also be constituted as separate components, which are connected with each other.

The connector again is preferably formed as one piece on the extended part and are intended for being inserted into an associated connecting point on the mounting base, namely in particular for providing a (positive) snap-in or plug-in connection by displacing the base body along the guide track of the support body provided for this.

Moreover, the extended part is preferably angled in the area of the connector in such a way that the connecting means can slide over a ramp provided at the connecting point of the mounting base.

A guide is advantageously provided on the extended part, by which the extended part can be displaced along an assigned guide device of the support body, in particular along the same guide track as the base body of the securing device, in the extension direction of the measuring graduation. The guide directly adjoins the connector in the extension direction of the extended part and are advantageously constituted by two guide areas, which are spaced apart from each other in this extension direction. It is possible to achieve by this that, when the connector of the extended part engage the associated connecting point of the mounting base, in particular in the course of a simultaneous passage over a ramp of the mounting base, the extended part is clamped to the support body by being lifted, i.e. by a movement transversely to the displacement direction of the base body and of the extended part, in that the guide of the extended part is pressed against the associated guide device of the support body.

For a particularly stable fixation of the extended part on the mounting base on the one side and on the support body on the other side, the extended part has two legs which substantially run parallel with each other and each of which is provided with connecting means, as well as the guide.

The base body of the securing device itself is embodied in such a way that it can be positively fastened on the mounting base by a plug-and/or snap-in connection by shifting it along the guide track of the support body. For this purpose, the base body on its part can have plug-in elements, which can be inserted into a plug area of the mounting base assigned to them. Preferably these plug-in elements are formed by respective protrusions of the base body, in particular in the form of a contact protrusion, which can be inserted into a recess of the mounting base. Furthermore, the base body can have a snap-in element in the form of an elastic snap-in lever, which can be snapped into a snap-in location of the mounting base designed as a snap-in opening.

In order to be able to fix the base body in place in a defined position on the support body, and in this way also to position the mounting base with respect to the support body, the base body has a guide, which can be displaced along the guide track in the direction of extension of the measuring graduation and can be clamped to it with the aid of an actuating element. The actuating element is preferably designed to be rotatable and can be embodied as a knurled screw or knurled nut, for example. When actuated, the latter acts on a (separate) clamping element which, in turn, clamps the guide against the guide track of the support body and in this way provides a clamped connection.

Three different states of the clamping element can be produced by the clamping element, wherein the securing device can be removed from the support body in the one state of the clamping element, in a further state of the clamping element the securing device can be shifted along the guide track, and in the third state of the clamping element the securing device is clampingly fixed in place on the support body. Snap-in positions can be provided on the actuating element, by which the actuating element can be arrested in various positions corresponding to the three above mentioned states of the clamping element. Alternatively, the positions of the actuating element corresponding to the three above mentioned states of the clamping element can be identified by markers.

In accordance with a further embodiment of the present invention, the actuating element has a blocker for producing a return stop which, while working together with an associated blocking element of the base body, prevent the actuator from being accidentally moved into a state in which the clamping piece would be released from the securing device.

A measuring arrangement for determining the position of two components, which can be moved relative to each other and have a securing device in accordance with the present invention is distinguished by a measuring arrangement including a linearly extending measuring graduation, a support body for the measuring graduation, the support body having a guide track. A scanning device scans the measuring graduation and is guided at a defined distance from the measuring graduation and a mounting base that fastens the scanning device to one of the two components which are movable with respect to each other. A securing device including a base body longitudinally shifted along the guide track, wherein one end of the base body can be fastened to the mounting base and a second end of said base body can be fastened to the support body in order to maintain the mounting base in a defined nominal position with respect to the support body. The securing device further including an extended part protruding away from the base body and extending along the measuring graduation in an extension direction. The measuring arrangement further including a connector provided on the extended part which can be automatically brought into engagement with a connecting point of the mounting base.

A mounting base of such a measuring arrangement has two end faces, which are spaced apart from each other along an extension direction of the measuring graduation, wherein the base body can be fixed in place on one front face, and the extended part with its connector can be fixed in place in the vicinity of the other front face of the mounting base.

A connecting point is provided on the mounting base for this purpose, which is automatically engaged by the connector of the extended part when the base body is fixed in place (by shifting it along the guide track of the support body) on the mounting base. This is preferably accomplished in such a way that, in the course of fixing the base body in place on the mounting base, the extended part snaps with its connector into the associated connecting point of the mounting base and in this way provides a positive, as well as a supplemental frictional connection, if required.

The connecting point of the mounting base has a ramp, by which the extended part is lifted in the area of its connector, so that the guide of the extended part are pushed against a stop at the associated guide device of the support body and a clamping connection is made between the extended part and the support body.

A ramp is here generally understood to be an element provided at the connecting point of the mounting base which causes a shifting, or deformation, of the connector of the extended part transversely to their direction of shifting on the guide track, or transversely to the direction of extension of the measuring graduation, independently of the geometric design of the ramp. Therefore the latter need not necessarily be designed in the manner of an inclined plane or the like. It is sufficient if the ramp can cause a movement of the connector (possibly by elastic deformation of the connector) transversely with respect to the above mentioned direction of extension or shifting.

To ease the insertion of the connector of the extended part into the associated connecting point of the mounting base, the latter has an insertion heel.

If the extended part includes two legs extending parallel with respect to each other, each of which has a connector and a guide, two connecting points (arranged transversely to the guide track side-by-side) are provided on the mounting base, each of which is assigned to one of the two legs of the extended part.

The guide track of the support body, along which the securing device is movable and to which the securing device can be clampingly fastened, is preferably formed by two guides extending parallel with each other, which are engaged by the respective guide means of the base body and the extended part. Respectively one more (outer) guide can extend besides these two guides of the guide track, which is additionally engaged by the base body of the securing device in order to achieve the horizontal fixation in place of the securing device on the support body in the plane defined by the various guides.

Further characteristics and advantages of the present invention will become clear in the course of the following description of an exemplary embodiment by the drawings.

DETAILED DESCRIPTION OF THE PREFERRED EMBODIMENTS

A measuring arrangement for determining the position of two components of a machine tool (machine components M1, M2) which can be moved relative to each other is represented in FIGS. 1A to 5, which includes a support body 1 and a scanning device 2, as well as a securing device 3, 4 by means of which the scanning unit 2 can be maintained in a defined nominal position on the support body 1.

Figure 1A:
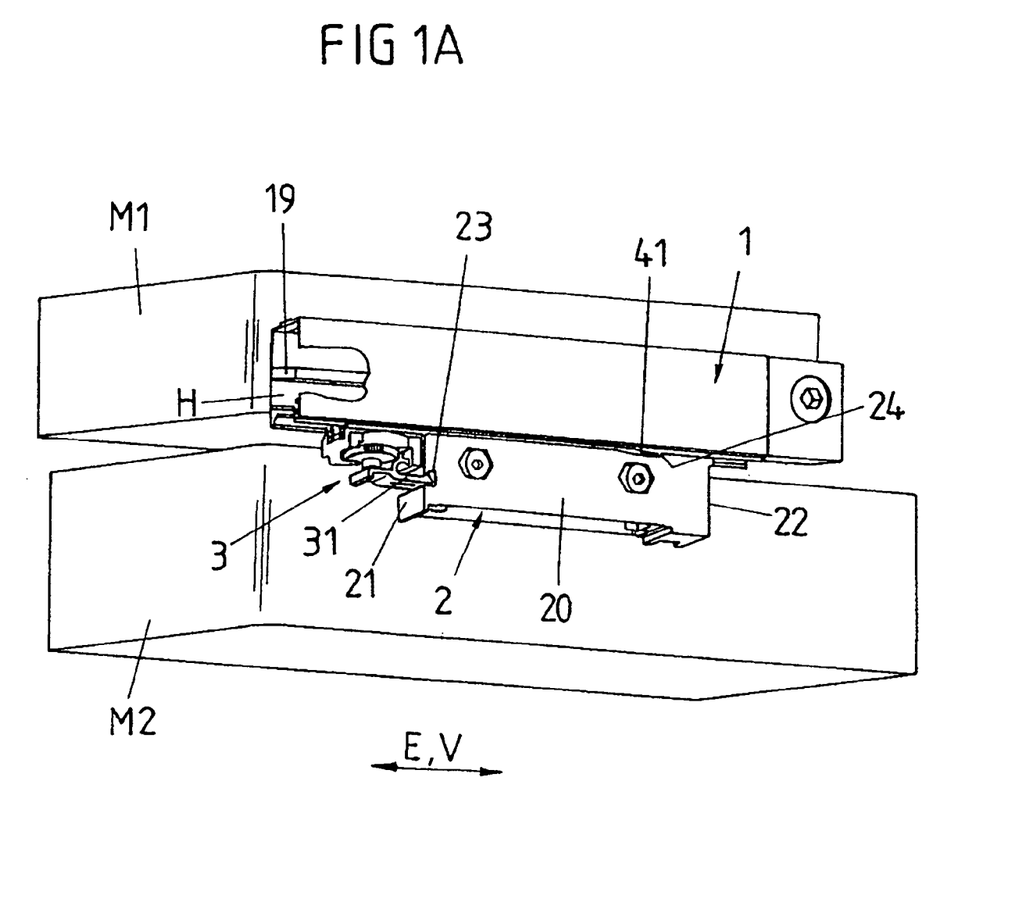
FIG. 1A is a perspective representation of an embodiment of a measuring arrangement for determining the position of two components which are movable with respect to each other, having a support body for a linearly extending measuring graduation, having a scanning device for scanning the measuring graduation, which is longitudinally displaceably guided and can be fastened by an embodiment of a mounting base to one of the components which are movable with respect to each other, as well as having an embodiment of a securing device for maintaining the mounting base in a defined nominal position on the support body.
Figure 1B:
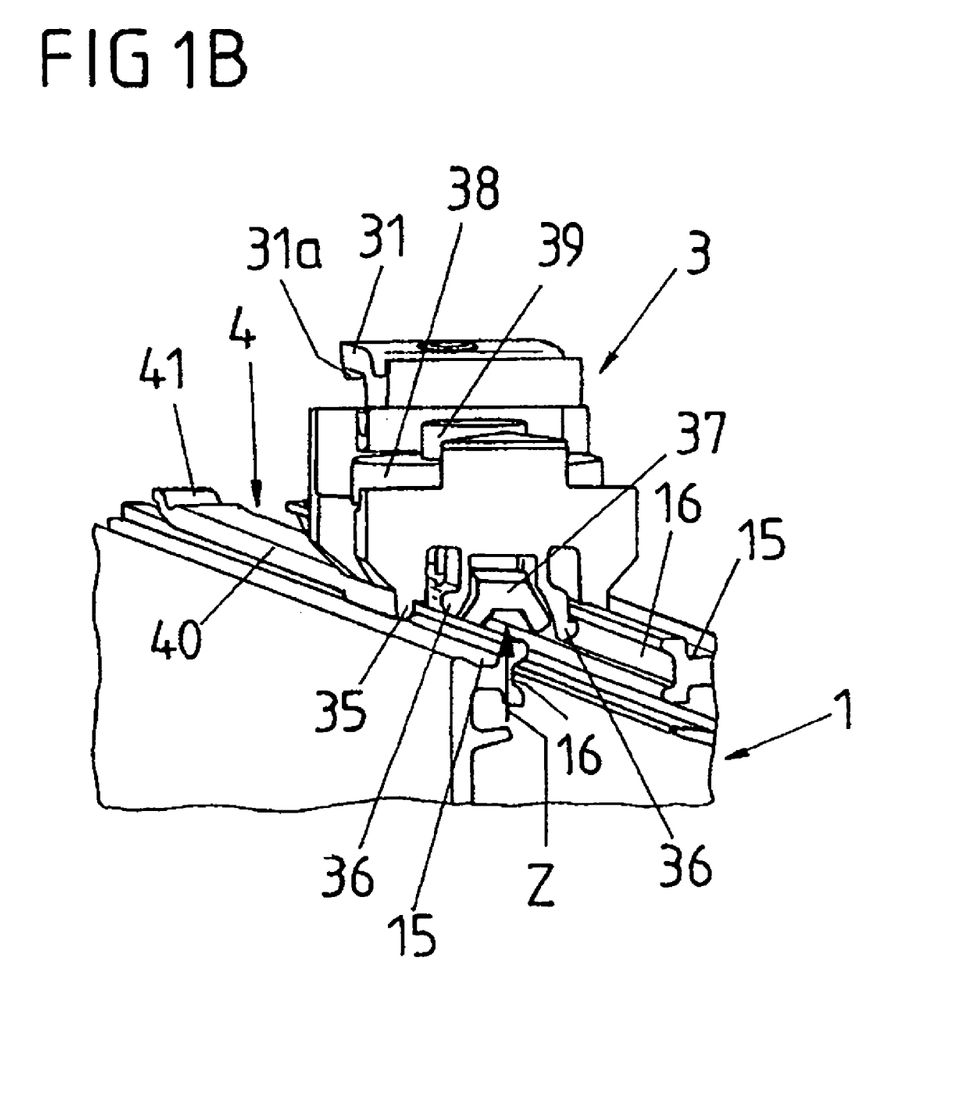
FIG. 1B is a further perspective representation of the measuring arrangement in FIG. 1A, but without the mounting base.
Figure 2A:
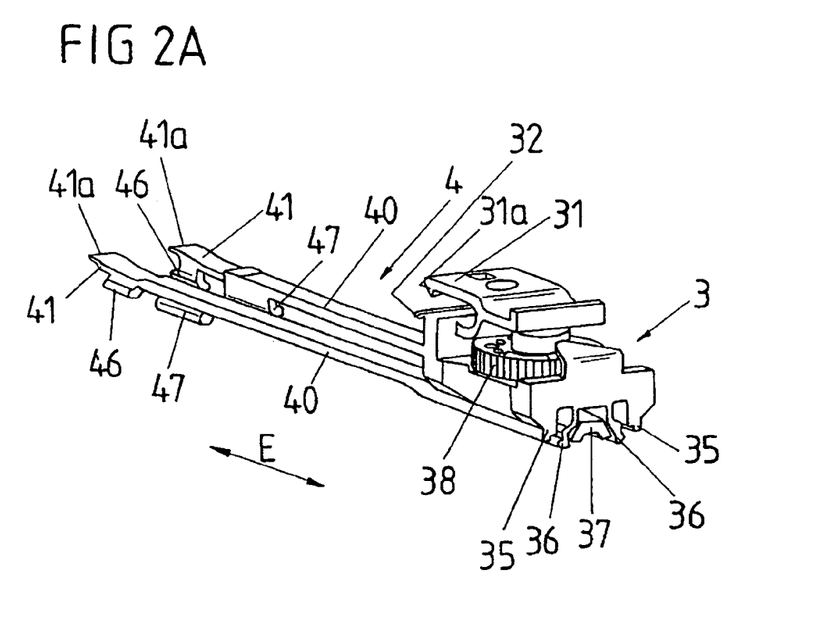
FIGS. 2A and 2B are two different perspective representations of the securing device in FIGS. 1A and 1B.
Figure 2B:
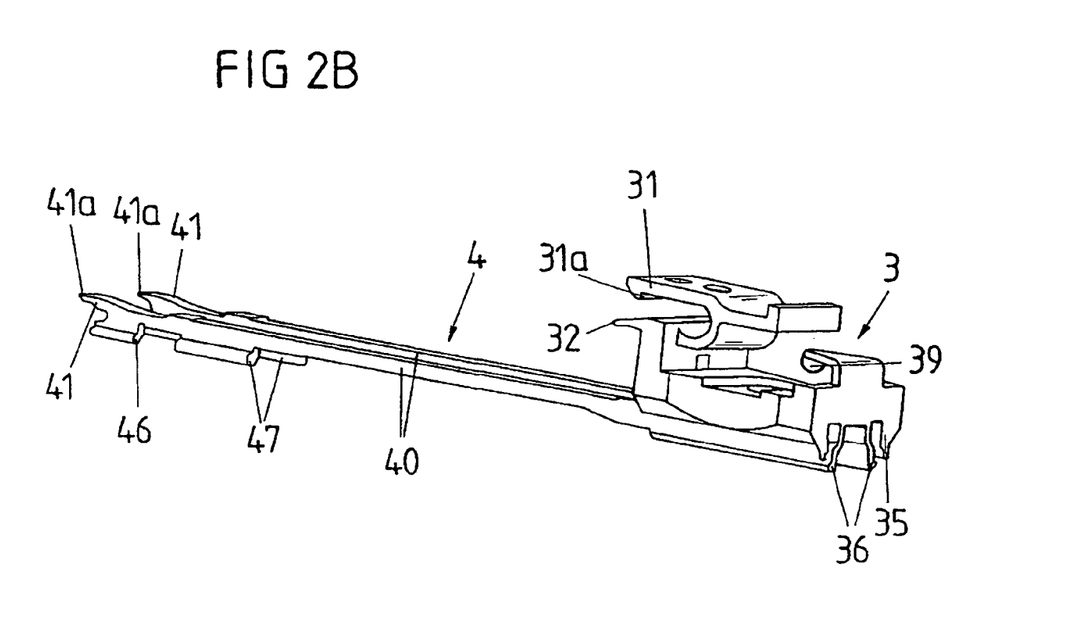
Figure 3:
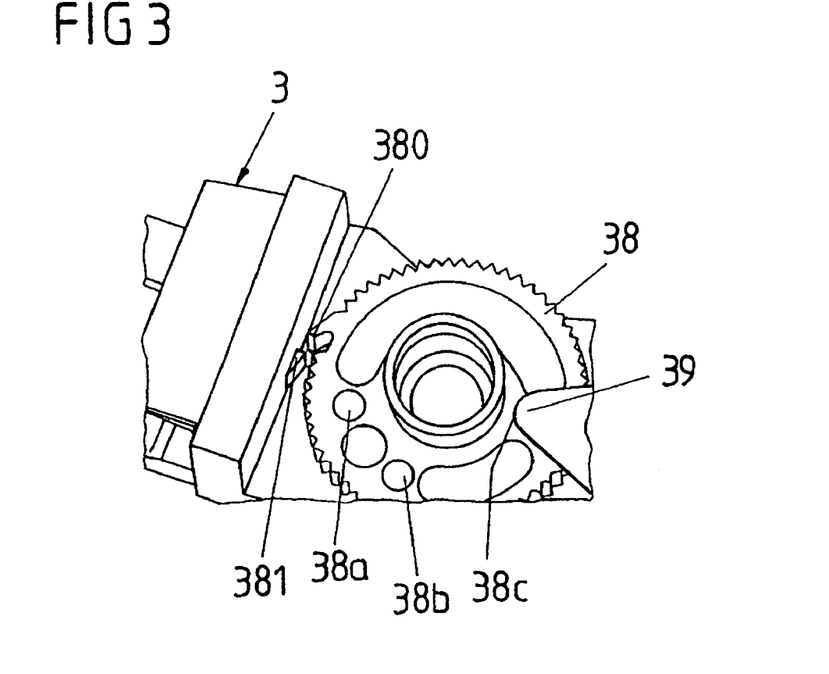
FIG. 3 is a perspective representation of a portion of the securing device in FIGS. 1A and 1B.
Figure 4:
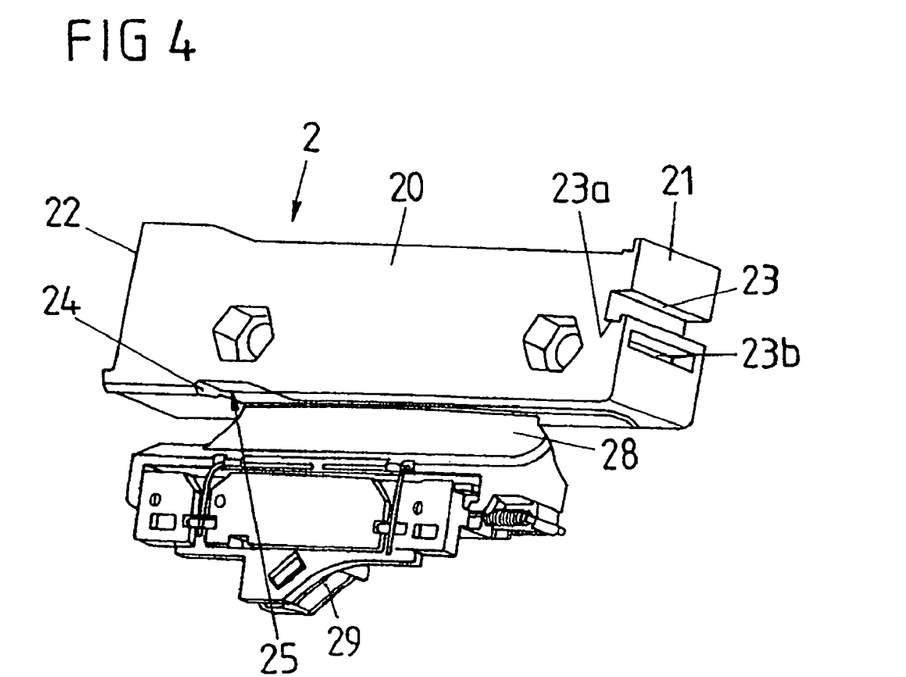
FIG. 4 is a perspective representation of an embodiment of a mounting base to be used with the measuring arrangement of FIGS. 1A and 1B.
Figure 5:
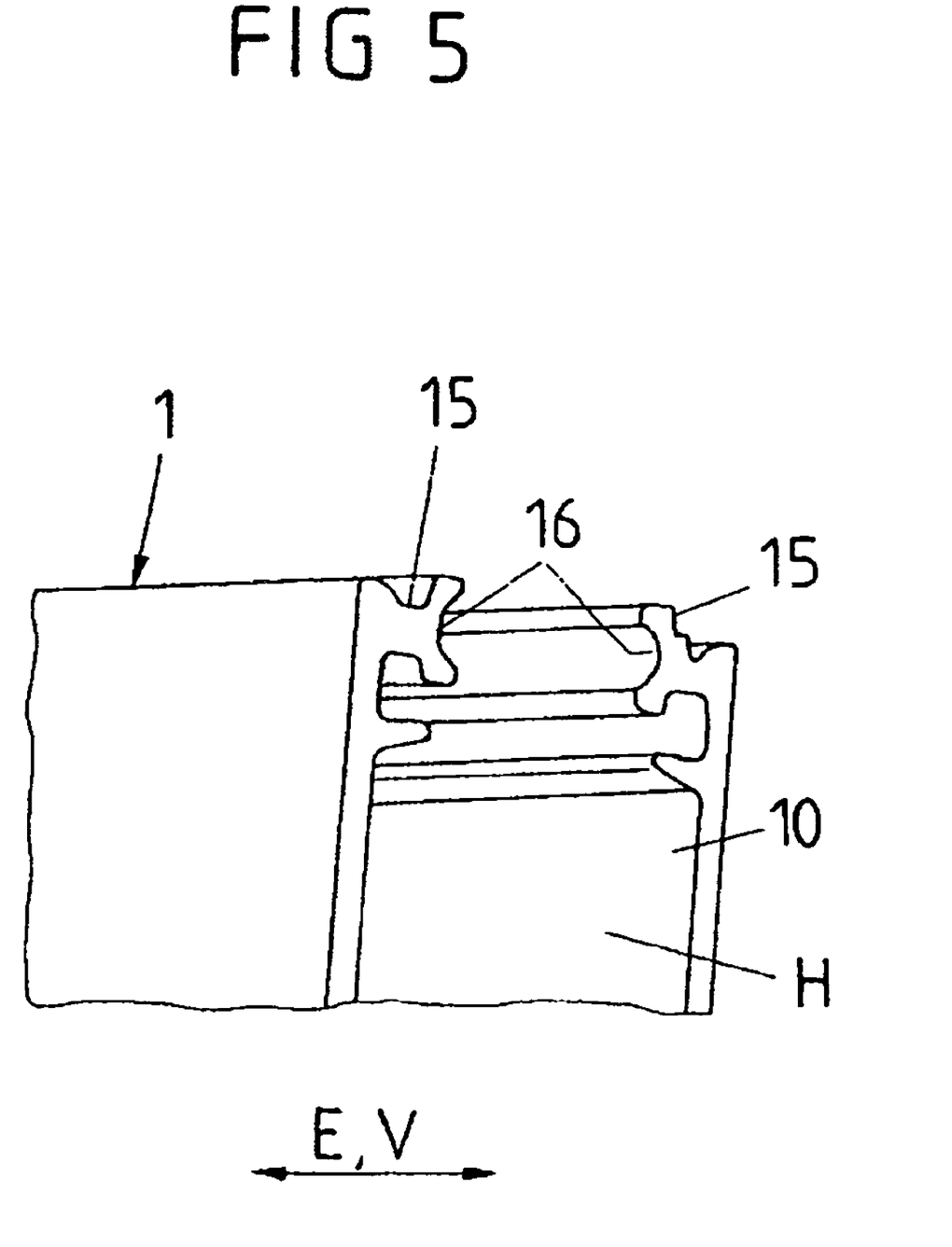
FIG. 5 is a perspective representation of a portion of an embodiment of a support body to be used with the measuring arrangement of FIGS. 1A and 1B.

The support body 1 is designed for being fastened on a machine component, for example on the carriage M1 of the machine tool, and has a linearly extending hollow profiled element 10 with an inner guide track formed by two inner guides 16, which extend parallel to each other along the extension direction E of the hollow profiled element 10. An outer guide 15 extends next to each one of the inner guides 16.

This hollow profiled element 10 encloses an inner hollow space H, in which a linearly extending measuring graduation 19 is arranged.

A scanning carriage 29 of a scanning device 2 is arranged, linearly displaceable, inside the hollow profiled element 10 and for example supports a light source, a lens system and associated photo elements for scanning the measuring graduation 19 of the support body 1. In a known manner, the scanning carriage 29 is connected, resiliently an engagement piece 28, but rigidly in the extension direction E of the hollow profiled element 10 (measuring direction), with a mounting base 20, arranged outside the hollow chamber H of the hollow profiled element 10. The mounting base 20 is used for attaching the scanning device 2 to a second machine component, for example the bed M2 of the above mentioned machine tool. The shifting direction V of the scanning device 2, i.e. the mounting base 20 and the scanning carriage 29, along the support body 1 corresponds to the extension direction E of the hollow profiled element 10 and the measuring graduation 19 arranged therein.

A measuring arrangement of the above mentioned type is generally known and therefore its function does not need not be explained in detail here.

In accordance with FIGS. 1A to 5, a securing device 3, 4 is assigned to the measuring arrangement and is connected with the mounting base 20. This securing device 3, 4 has a base body 3 and an extended part 4 (formed in one piece on the latter), which extends along the extension direction E of the hollow profiled element 10 and extends between the mounting base 20 and the support body 1, or the hollow profiled element 10 of the latter, i.e. is located between facing surfaces of the mounting base 20 on the one hand, and of the support body 1, or its hollow profiled element 10, on the other hand. The extended part 4 is embodied to be fork-shaped with two legs 40 extending parallel with each other. On the one end, the base body 3 of the securing device 3, 4 can be fixed in place to a front face 21 of the mounting body 20, and can be fixed on the other end with both legs 40 of its extended part 4 in the vicinity of an oppositely located front face 22 of the mounting base 20.

For one, for fixing the base body 3 of the securing device 3, 4 in place on a front face 21 of the mounting base 20, a plug-in element 32 in the form of a contact protrusion is used, which can be introduced into an associated plug area 23b in the shape of a recess at the one front face 21 of the mounting base 20. Furthermore, a snap-in element in the form of a resilient snap-in lever 31 with a snap-in protrusion 31A is used for this, which can be snapped into an associated snap-in point in the form of a snap-in opening 23 with a snap-in groove 23a at the one front face 21 of the mounting base 20.

For fixing the two legs 40 of the extended part 4 of the securing device 3, 4 in place on the other front face 22 of the mounting base 20, which is spaced apart from the one front face 21 in the extension direction E of the extended part 4, connectors 41, 41A are used, which are respectively embodied in the form of a tongue 41 with a contact protrusion 41A at the ends of the two parallel legs 40 and which are angled away from the respective legs 40. These connectors 41, 41A can be inserted into an associated connecting point 24 (constituted by a groove) of the mounting base 20, in the course of which a positive connection between the legs 40 of the extended part 4 and the mounting base 20 of the scanning device 2 is made. The connecting point 24 of the mounting base 20 is located on the surface of the mounting base 20 facing the support body 1, or its hollow profiled element 10 (is located in front of the second front face 22 of the mounting base 20 in the extension direction E of the extended part 4).

By the above described steps, the securing device 3, 4 can respectively be connected on the one hand in the area of its base body 3, and on the other hand at the end of the extended part 4 facing away from the base body 3, with the mounting base 20 in the area of the front faces 21, 22 of the latter. It is moreover necessary for holding the mounting base 20 on the hollow profiled element 10 of the support body 1 in a defined nominal position, to fix the securing device 3, 4 in place also with respect to the hollow profiled element 10 of the support body 1. This is performed by clamping bodies, which will be explained in what follows.

It can be seen by FIGS. 1A to 5, that the base body 3 of the securing device 3, 4 engages the two inner guides 16 of the hollow profile 10 with guide means in the form of clamping feet 36. A clamping piece 37 is assigned to these clamping feet 36, which is received as a separate part between the two clamping feet 36 and which, by an associated actuating element in the form of a knurled nut 38, can be shifted (lifted) in a direction z perpendicularly in relation to the extension direction E of the hollow profiled element 10 and of the extended part 4, wherein in the process it pushes the clamping feet 36 of the base body 3 outward into the respectively associated inner guide 16 of the hollow profiled element 10 and in this way produces a positive and simultaneously clamping connection between the base body 3 and the hollow profiled element 10 of the support body 1, so that the base body 3 is fixed in place with respect to the support body 1 along its shifting direction V (because of the clamping effect), as well as horizontally and vertically perpendicular to the shifting direction V (in particular based on the positive connection). To this end, the actuating element in the form of a knurled nut 38 acts via an inner screw thread together with an outer screw thread on the clamping piece 37.

Moreover, the position of the base body 3 with respect to the hollow profiled element 10 of the support body 1 in the horizontal direction perpendicular to the shifting direction V (i.e. in the planes defined by the inner guides 16) is fixed in that the base body 3 is guided by an additional outer guide 35 in a respectively outer guide 15 of the hollow profiled element 10, wherein each of the two outer guides 15 extends next to one of the inner guides 16 of the hollow profiled element 10 and parallel with it.

A clamping connection between the securing device 3, 4 and the hollow profiled element 10 of the support body 1 is also provided in the area of the front faces of the legs 40 of the extended part 4, namely by guides 46, 47 provided there. The guides 46, 47, each arranged in the area of the front face of the two legs 40, are respectively formed by a first guide area 46, which is directly connected in the extension direction E of the extended part 4 with the connector 41 of the respective leg 40, as well as by a second guide area 47, spaced apart from this in the extension direction E. At least the first guide areas 46 at the respective leg 40 of the extended part 4 are lifted in the course of the engagement of the connector 41 with the associated connecting point 24 of the mounting base 20 because of their acting together with a ramp 25 respectively provided there in such a way that they are clampingly pressed against an associated stop of the respective inner guide 16 of the hollow profiled element 10 of the support body 1, and are clampingly fastened on it because of this, so that simultaneously the position of the extended part 4 (and therefore also of the mounting body 20 fixed in place on it) is fixed with respect to the hollow profiled element in the vertical direction z perpendicularly in relation to the extension direction E, or the shifting direction V.

A total of three different states of the base body 3 in regard to its positioning at the hollow profiled element 10 of the support body 1 can be defined by actuating the clamping piece 37 by means of the associated knurled nut 38. In the one state the clamping piece 37 is lifted in the vertical direction z by the knurled nut 38 so far, that the base body 3 is clampingly fastened in the associated inner guides 16 of the hollow profiled element 10 by means of the clamping feet 36. In the other state the clamping piece 37 is in a position in which it does not push the clamping feet 36 of the base body 3 apart, so that the latter can be shifted in the inner guides 16, as well as in the outer guides 15, in the shifting direction V. Finally, in a third state the clamping piece 37 is released from the base body 3 far enough, so that the latter can be removed from the hollow profiled element 10 of the support body 1. These different states in regard to the fastening of the base body 3 at the hollow profiled element 10 correspond to different positions of the knurled nut 38, to each of which corresponding snap-in points 38A, 38B, 38c of the knurled nut 38 are assigned. In each one of the three described states, one of these snap-in points 38A, 38B, 38c is in engagement with an associated snap-in element 39 of the base body 3 in the form of a snap-in hook. By this the appropriate states can be definitely set by the knurled nut 38, and the knurled nut 38 can be maintained in a position corresponding to the respective state.

A return stop 380, 381 is furthermore provided, which prevents the actuating element in the form of a knurled nut 38 from rotating so far in the release direction that the clamping piece 37 is completely disengaged from the base body 3. The return stop 380, 381 includes an elastic blocking member in the form of a protrusion 380 formed on the knurled nut 38, as well as a blocking element 381 formed on the base body 3. In the course of a rotating movement of the knurled nut 38 in the fixation direction (i.e. in a clockwise direction in FIG. 3), which is intended to cause a clamping fastening of the base body 3 on the hollow profiled member 10 of the support body 1, the protrusion 380 arranged on the knurled nut 38 can pass over the associated blocking element 381 of the base body 3. However, during a reverse movement of the knurled nut 38 in the opposite direction (in the counterclockwise release direction), the protrusion 380 provided on the knurled nut 38 comes into engagement with the blocking element 381 provided on the base body 3 and in this way prevents the further turning of the knurled nut 38 in the release direction, which would result in the complete release of the clamping piece from the base body 3.

In what follows it will now be described by FIGS. 6A to 9B how the securing device 3, 4 is connected with the mounting base 20, wherein the fastening of the base body 3 on the one front face 21 of the mounting base 20 simultaneously results in a connection between the extended part 4 and the mounting base 20 in the area of the other front face 22 of the latter.

Figure 6A:
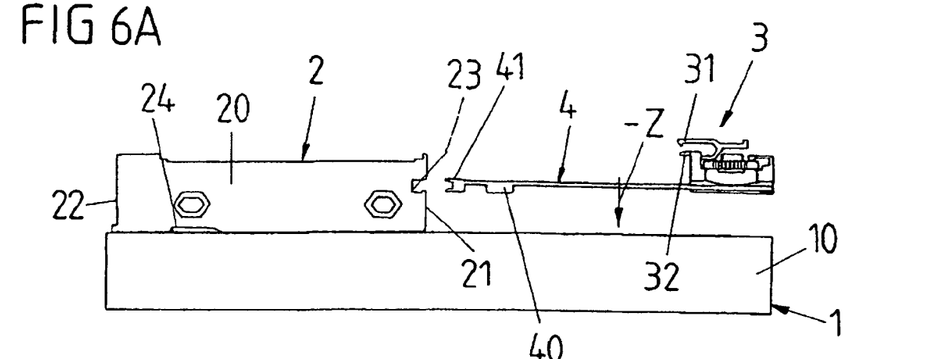
FIGS. 6A to 6D represent four possible method steps in the course of providing a connection between the securing device and the mounting base to be used with the measuring arrangement of FIGS. 1A and 1B for positioning the mounting base in a defined nominal position on the support body by the securing device.
Figure 6B:
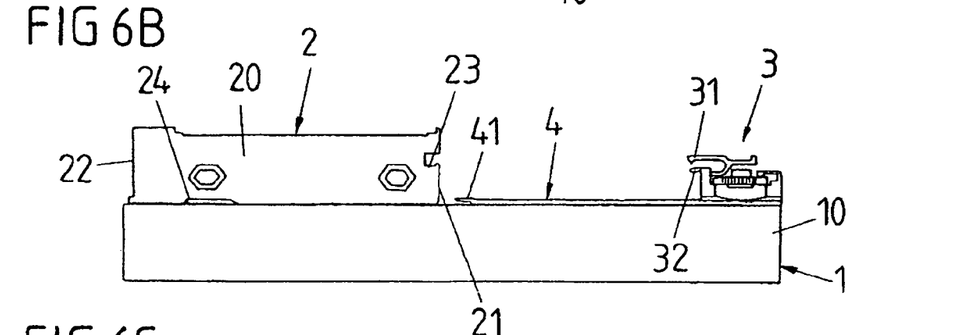
Figure 6C:
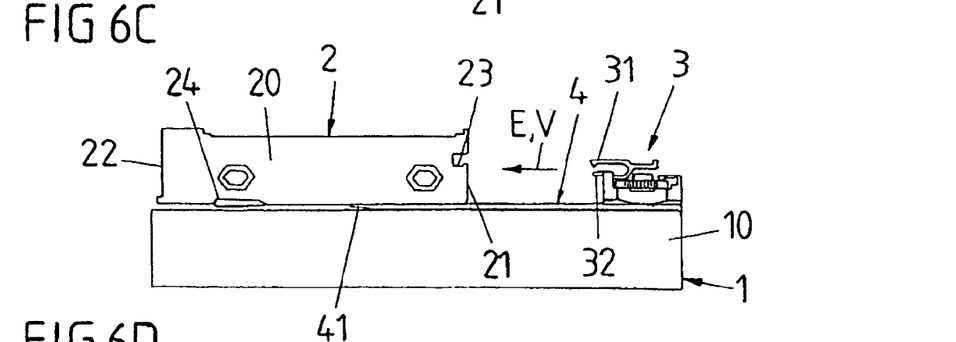
Figure 6D:
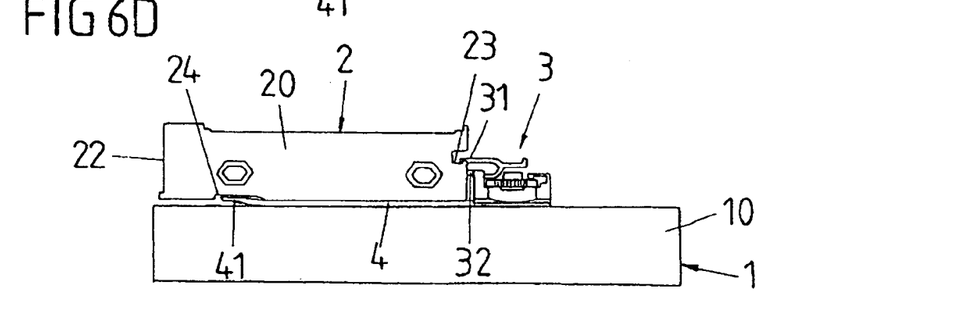

In accordance with FIG. 6A, the securing device 3, 4 (securing for transport) is placed onto the hollow profiled member 10 of the support body 1 and is then positioned in accordance with FIG. 6B between the hollow profiled member 10 and the mounting base 20, where subsequently a further shifting along a shifting direction V in the extension direction E of the hollow profiled member 10 takes place, see FIG. 6C. The outer guides 15 and inner guides 16 provided on the hollow profiled member 10 are used for this which, as described above by FIGS. 1A to 5, act together with corresponding guide of the base body 3 and the extended part 4 of the securing device 3, 4. Shifting takes place in such a way that the base body 3 of the securing device 3, 4 approaches the one front face 21 of the mounting base 20 until the contact protrusion 32 of the base body 3 engages the associated recess 23b of the mounting base 20, and finally the snap-in lever 31 of the base body 3 comes into engagement with the associated snap-in opening 23 of the mounting base 20 for forming a positive snap-in connection, secure against loss, see FIG. 6D.

In the course of inserting the snap-in lever 31 and of the contact protrusion 32 of the base body 3 into the associated snap-in opening 23 or the recess 23b of the mounting base 20, the connector 41 provided at the front faces of the legs 40 of the extended part 4 come into engagement with the associated connecting points 24 in the area of the other front face 22 of the mounting base 20, as will be described in greater detail in what follows by FIGS. 7A to 9B.

Figure 7A:
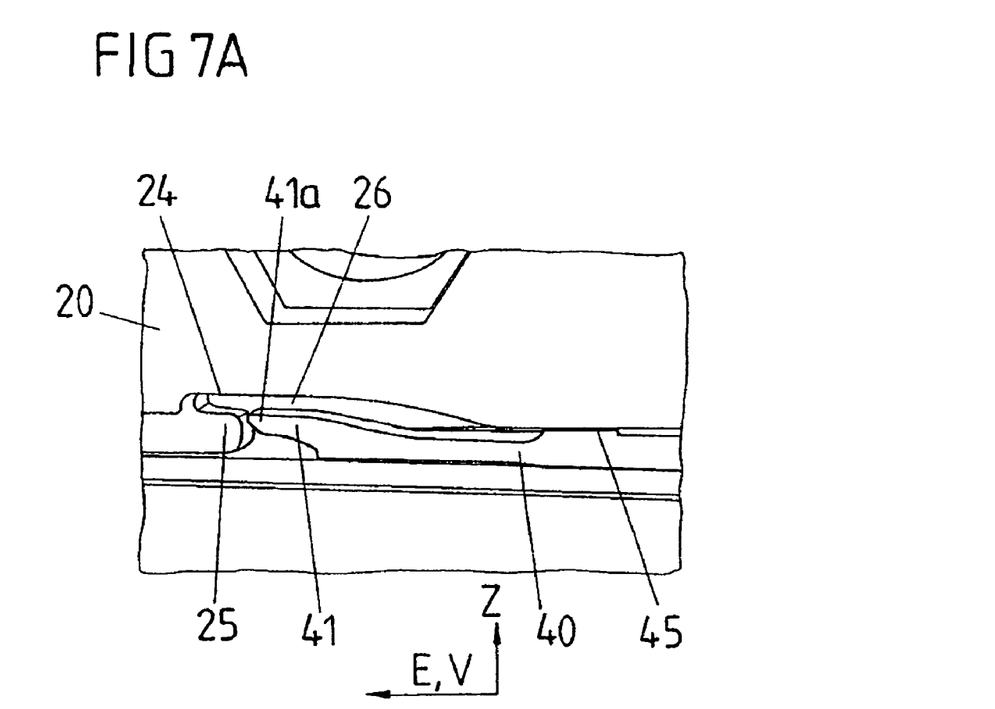
FIG. 7A is an enlarged representation of an embodiment of a connector of the securing device of FIG. 3 when being introduced into an associated connecting point of the mounting base of FIG. 4.

In the state represented in FIG. 7A, front contact protrusions 41A of the connecting means 41 designed as angled-off tongues enter the respectively assigned connecting point 24 of the mounting base 20. In the process they are received with horizontal positive engagement between the mounting base 20 of the scanning device 2 and the hollow profiled member 10 of the support body 1.

Prior to attaining this horizontal positive engagement, the connectors 41, 41A each pass through a heel 26 provided on the mounting base 20, which acts as an insertion heel and makes additional horizontal play available for making the insertion of the connector 41 of the extended part 4 into the associated connection point 24 of the mounting base 20 easier prior to reaching the position represented in FIG. 7A, in which the connectors 41, 41A are positively connected between the mounting base 20 and the hollow profiled member 10.

Figure 7B:
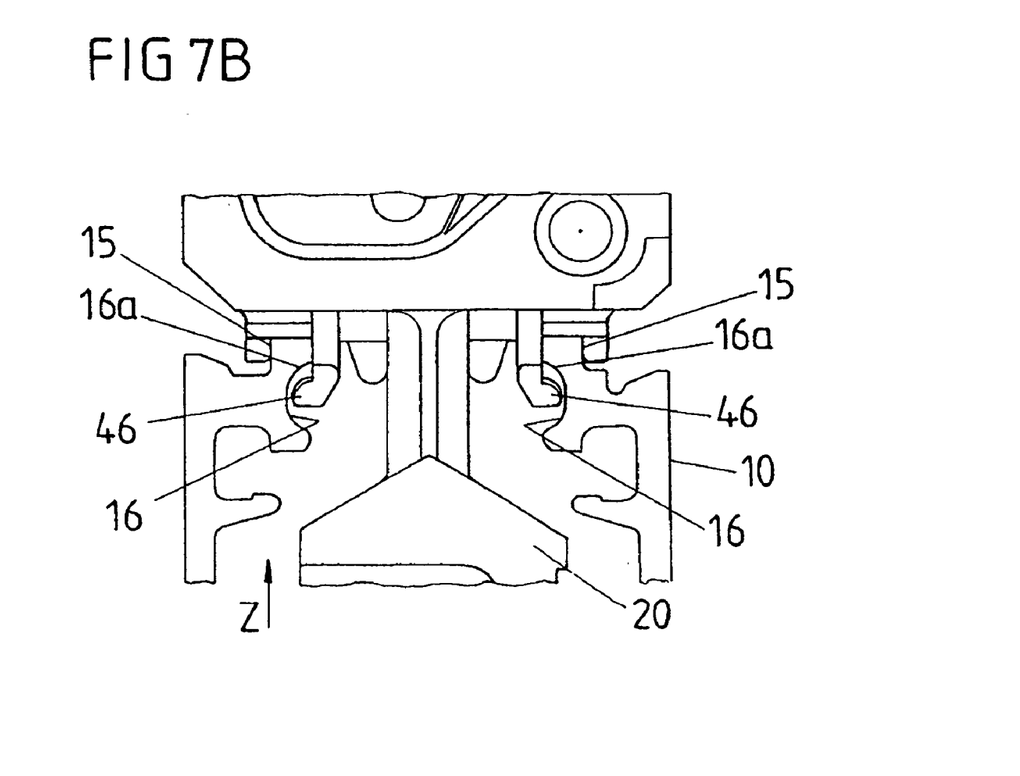
FIG. 7B represents the interaction between an embodiment of a guide of the securing device of FIG. 3 and an embodiment of a guide track of the support body of FIG. 5 in the course of introducing the connector of FIG. 7A of the securing device into the connecting point of the mounting base of FIG. 4 in accordance with FIG. 7A.

By FIG. 7B it becomes clear that in the represented state there is still some play in the vertical direction z between the front guide areas 46 of the legs of the extended part 4 and the associated upper stops 16A of the inner guides 16 of the hollow profiled member 10.

Figure 8A:
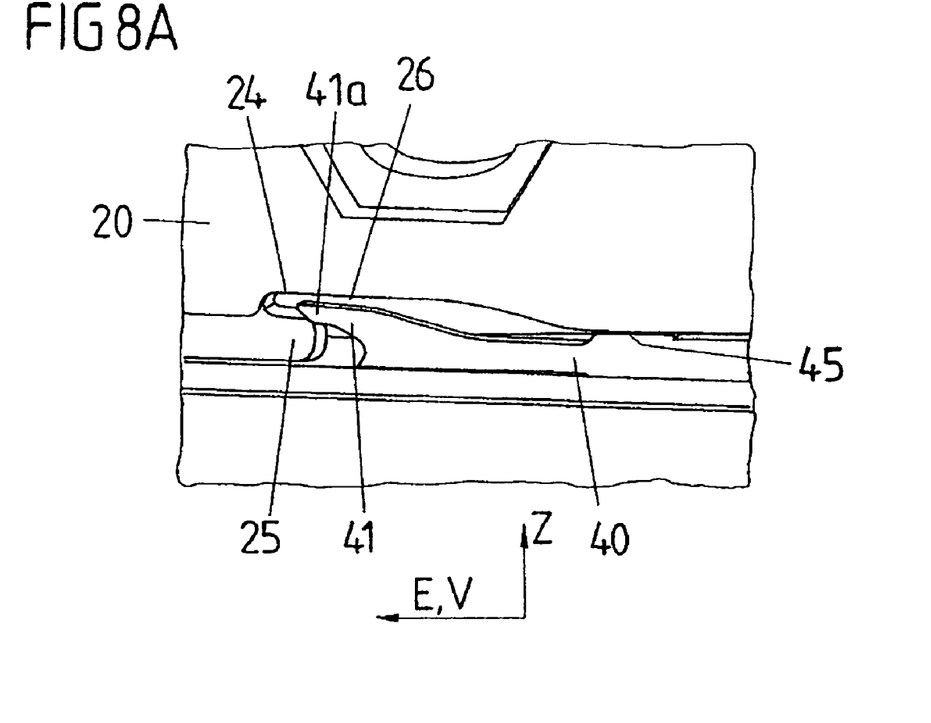
FIGS. 8A and 8B are representations in accordance with FIGS. 7A or 7B, wherein the connector travels over a ramp of the connecting point.

In the course of further shifting of the base body 3 and the extended part 4 of the securing device 3, 4 in the shifting direction V, so that the snap-in lever 31 (see FIG. 6D) of the base body 3 snaps into the associated snap-in opening 23 of the mounting base 20, the front contact protrusions 41A of the connecting means 41, 41A of the legs 40 of the extended part 4 each runs up on an associated ramp 25 in the respective connecting point 24 of the mounting base 20. In the course of this the tongues 41 of the connecting means 41, 41A are slightly deformed (bent upward in the vertical direction z). In this case the complete bending of the legs 40 of the extended part 4 in the areas outside of the angled-off tongues 41 is prevented by the rear guide areas 47 of the legs 40.

Figure 8B:
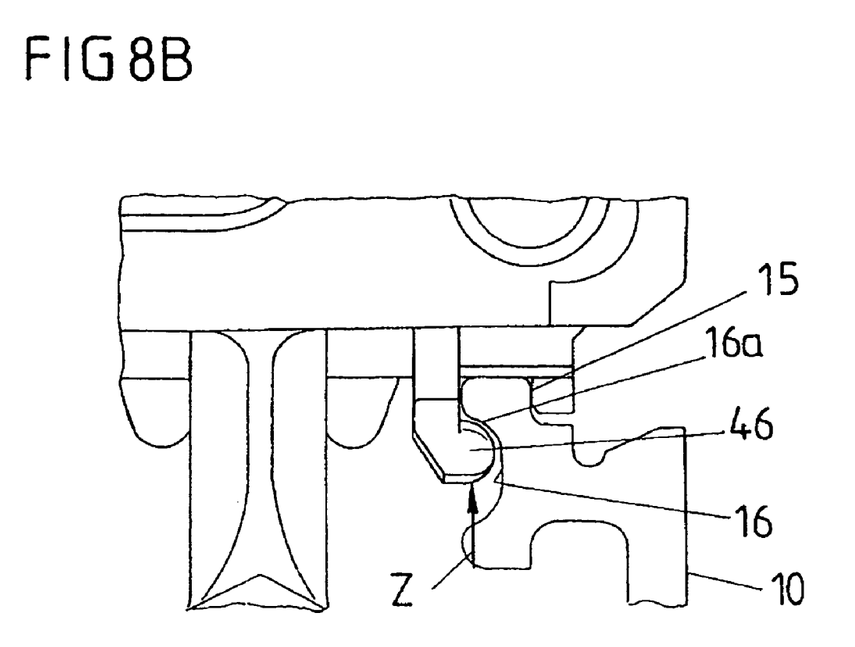

At the same time the front guide areas 46 (because of running up on the ramps 25) are lifted in the vertical direction z in the direction toward the upper stops 16A of the inner guides 16 of the hollow profiled member 10, see FIG. 8B.

Figure 9A:
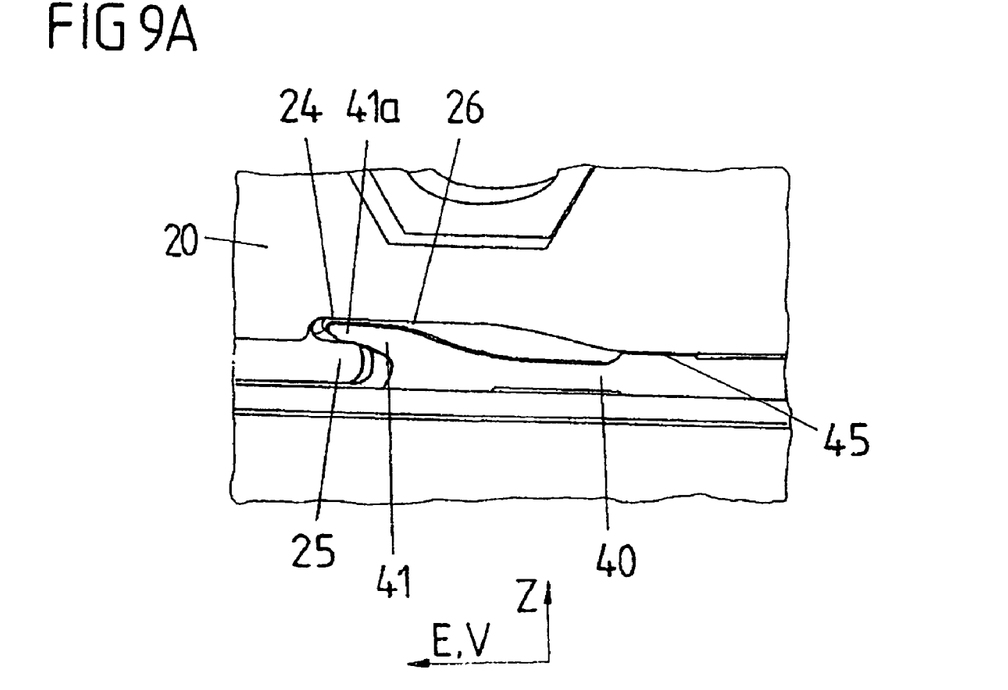
FIGS. 9A and 9B are representations in accordance with FIGS. 7A or 7B after completing the engagement of the connector with the connecting point.
Figure 9B:
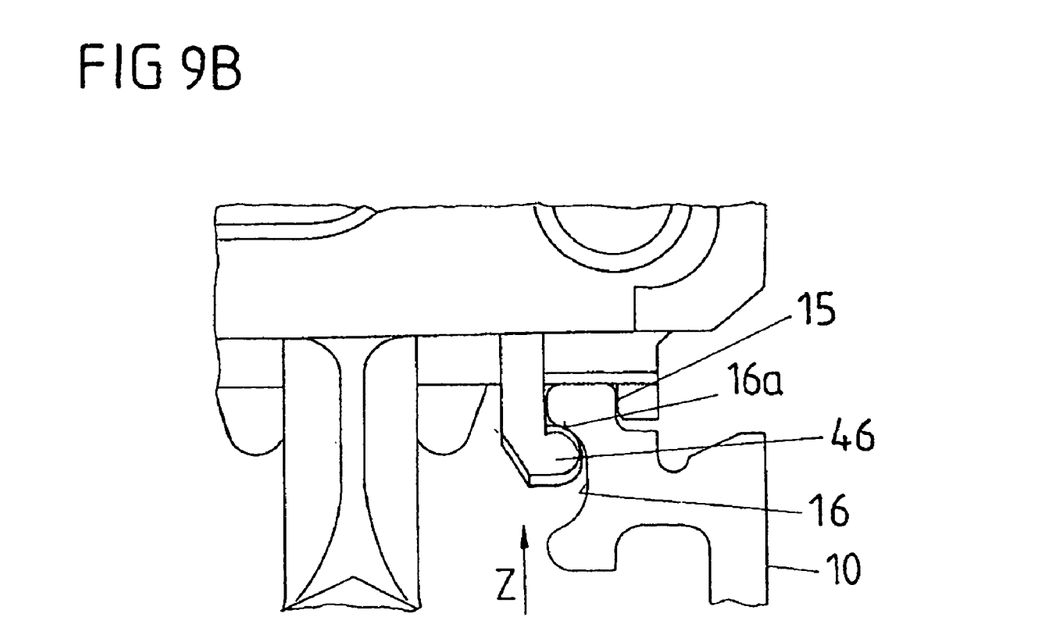

Finally, the end position of the connectors 41, 41A in the associated connecting points 24 of the mounting base 20 is represented in FIGS. 9A and 9B. With their respective contact protrusion 41A, the connecting means 41, 41A have snapped into the connecting points 24 of the mounting base 20 respectively constituted by a groove above the respective ramp 25. Because of the complete run-up of the contact protrusions 41A on the respectively associated ramp 25 of the appropriate connecting point 24, the front guide areas 46 of the legs 40 of the extended part 4 have been lifted in the vertical direction z far enough so that they are each pressed against an upper stop 16A of the inner guide 16 of the hollow profiled member 10. The vertical position (perpendicularly with respect to the extension direction E and shifting direction V) of the extended part 4 of the securing device 3, 4 in relation to the hollow profiled member 10 of the support profile 1 is fixed. This therefore also applies to the mounting base 20 of the scanning unit 1 fastened on the extended part 4. Here, the position is defined by the thickness (extension along the vertical direction z) of the legs 40 of the extended part 4 at a support point 45 through which the legs 40 rest against the mounting base 20 (besides the connecting point 24).

Thus, by fastening the base body 3 to the one front face 21 of the mounting base 20 (as represented in FIGS. 6A to 6D), a connection between the extended part 4 of the securing device 3, 4 and the mounting base 20 on the other front face 22 of the latter has been simultaneously provided. In the process, the extended part 4 of the securing device 3, 4 is clamped to the hollow profiled member 10 of the support body 1 at the same time.

This means that, besides the fastening of the base body 3 of the securing device 3, 4 on the mounting base 20 by shifting it along the support body 1, which is provided anyway, no additional mounting steps are necessary for making the connections between the extended part 4 and the mounting base 20, as well as between the extended part 4 and the support body 1.

Finally, the base body 3 is merely clamped in the manner described above in FIGS. 1A to 5 to the inner guides 16 of the hollow profiled member 10 by the knurled nut 38, the clamping piece 37, as well as the clamping feet 36 of the base body 3.

In conclusion, the above described securing device 3, 4 is distinguished in that no additional tools, such a screwdrivers, are necessary for its positive and non-positive fastening on the mounting base 20 of the scanning unit 2, as well as on the hollow profiled member 10 of the support body 1, and that it is only necessary to bring the base body 3 of the securing device 3, 4 into contact with the one front face 21 of the mounting base 20, wherein the plug-in and snap-in connections between the securing device 3, 4 and the mounting base 20 are automatically established, and furthermore a clamping connection between the extended part 4 of the securing device 3, 4 and the hollow profiled member 10 of the support body is generated. The disassembly of the securing device 3, 4 is also possible without tools in a corresponding manner.

The securing device 3, 4 can be brought into three different states by the knurled nut 38, wherein in the first state it is clamped to the hollow profiled member 10 of the support body 1 in order to maintain the scanning unit 2 in a defined nominal position on the support body 1 and to assure the keeping of mounting tolerances during the installation of the measuring arrangement in a machine tool. In a second state, the securing device 3, 4, together with the scanning unit 2, can be shifted in the extension direction E of the hollow profiled member 10, or of the support body 1 in order to be able to bring the scanning unit into a defined predeterminable position. Finally, in the third state the securing device 3, 4 lies only loosely on the support body 1 and can be taken off it.

The above described securing device furthermore has the advantages that both sides of the measuring arrangement 1, 2 can be used as mounting surfaces, so that an outgoing direction for cables can be freely selected, that the securing device can be used with the simultaneous use of a mounting rail, as well as that no elements surrounding the support body 1 and the mounting base 20 are required in order to keep stop faces free during mounting.

Further exemplary embodiments exist within the scope of the present invention besides the described examples.

I claim:

1. A securing device for transporting and mounting a measuring arrangement for the determination of the position of two components which are movable with respect to each other, said measuring arrangement comprising a linearly extending measuring graduation, a support body for said measuring graduation, a scanning device for scanning said measuring graduation, which is guided at a defined distance from said measuring graduation, and a mounting base for fastening said scanning device to one of said two components which are movable with respect to each other, wherein said securing device comprises:
a base body which is longitudinally shifted along a guide track of said support body, and which is on the one hand fixable to said mounting base; and which is on the other hand fixable to said support body in order to maintain said mounting base in a defined nominal position with respect to said support body; and
an extended part protruding away from said base body and extending along said measuring graduation in an extension direction; and
a connector provided on said extended part which can be automatically brought into engagement with a connecting point of said mounting base, wherein said connector is distanced from said base body in said extension direction, and said connector is provided at an end of said extended part distanced from said base body and said connector is brought into engagement with said connecting point by shifting said base body in said extension direction.

2. The securing device in accordance with claim 1, wherein said connector is formed as one piece on said extended part.

3. The securing device in accordance with claim 1, wherein said connector is inserted into said connecting point of said mounting base.

4. The securing device in accordance with claim 1, wherein said connector makes a plug connection.

5. The securing device in accordance with claim 1, wherein said connector makes a positive connection.

6. The securing device in accordance with claim 1, wherein said extended part is angled off in an area of said connector, so that the connector slides over a ramp of said connecting point.

7. The securing device in accordance with claim 1, wherein a section of said extended part is moved transversely with respect to said extension direction by elastic deformation.

8. The securing device in accordance with claim 1, wherein said connector comprises a contact protrusion which engages said connecting point.

9. The securing device in accordance with claim 1, wherein said extended part is formed as one piece on said base body.

10. The securing device in accordance with claim 1, further comprising a guide provided on said extended part, said guide shifts said extended part along an associated guide device of said support body in said extension direction.

11. The securing device in accordance with claim 10, wherein said guide adjoins said connector in said extension direction.

12. The securing device in accordance with claim 10, wherein said guide comprises a first guide area and a second guide area, which are spaced apart from each other in said extension direction and are provided on said extended part.

13. The securing device in accordance with claim 1, wherein said extended part comprises a first leg and a second leg, each of which extends substantially parallel with respect to each other, and said first leg is provided with said connector and said second leg is provided with a second connector.

14. The securing device in accordance with claim 1, wherein said base body is fastened on said mounting base by being shifted along a guide track of said support body.

15. The securing device in accordance with claim 14, wherein said base body is positively connected with said mounting base by a snap-in connection and/or a plug connection.

16. The securing device in accordance with claim 15, wherein said base body comprises a plug element that is plugged into a plug area of said mounting base.

17. The securing device in accordance with claim 16, wherein said plug element comprises a protrusion that is inserted into a recess of said mounting base.

18. The securing device in accordance with claim 15, wherein said base body comprises a snap-in element snapped into a snap-in opening of said mounting base.

19. The securing device in accordance with claim 18, wherein said snap-in element comprises a snap-in lever that is snapped into said snap-in opening.

20. The securing device in accordance with claim 1, wherein said base body comprises a guide that allows said base body to be shifted along a guide track of said support body in said extension direction.

21. The securing device in accordance with claim 1, wherein said base body comprises a clamping device that clamps on said support body.

22. The securing device in accordance with claim 21, wherein said base body comprises a guide that allows said base body to be shifted along a guide track of said support body in said extension direction.

23. The securing device in accordance with claim 22, wherein said guide is clamped in place on said guide track by said clamping device.

24. The securing device in accordance with claim 23, wherein an actuator is provided on said base body, said actuator actuates said clamping device, which acts on a clamping element of said clamping device.

25. The securing device in accordance with claim 24, wherein said actuator is rotatable.

26. The securing device in accordance with claim 25, wherein said actuator comprises a knurled screw or a knurled nut.

27. The securing device in accordance with claim 24, wherein a blocker is provided at said actuator, said blocker works together with a second blocker associated with said base body so as to limit a return movement of said actuator.

28. The securing device in accordance with claim 27, wherein snap-in points are provided on said actuator for arresting said actuator at different positions, each of which corresponds to a different state of said clamping device which is actuated by said actuator.

29. The securing device in accordance with claim 24, wherein markers are provided on said actuator, which represent different states of said clamping device which is actuatable by said actuator.

30. A measuring arrangement for determining the position of two components, which are movable in relation to each other, the arrangement comprising:
   a linearly extending measuring graduation;
   a support body for said measuring graduation, said support body comprising a guide track;
   a scanning device that scans said measuring graduation and is guided at a defined distance from said measuring graduation;
   a mounting base that fastens said scanning device to one of said two components which are movable with respect to each other; and
   a securing device comprising:
      a base body longitudinally shifted along said guide track, wherein said base body can be fastened to said mounting base and said base body can be fastened to said support body in order to maintain said mounting base in a defined nominal position with respect to said support body; and
      an extended part protruding away from said base body and extending along said measuring graduation in an extension direction; and
   a connector provided on said extended part which can be automatically brought into engagement with a connecting point of said mounting base; and
   wherein said mounting base comprises a first face and a second face that are spaced apart from each other in said extension direction, wherein said base body can be fixed in place on said first face, and said extended part can be fixed in place on said mounting base at said connecting point, which is distant from said first face in said extension direction.

31. The measuring arrangement in accordance with claim 30, wherein a connecting point is provided on said mounting base, which is automatically engaged by said connector when said base body is fixed in place on said mounting base.

32. The measuring arrangement in accordance with claim 31, wherein said connector snaps into said connecting point when said base body is shifted along said guide track for being fastened to said mounting base.

33. The measuring arrangement in accordance with claim 32, wherein said connector is brought into engagement with said connecting point in a positively connected manner.

34. The measuring arrangement in accordance with claim 31, wherein said connecting point has a ramp that allows said extended part to be moved in an area of said connector in a direction transverse with respect to said extension direction.

35. The measuring arrangement in accordance with claim 34, wherein said connector is moved transversely with respect to said extension direction by said ramp in such a way that a guide of said extended part is pushed against a stop of said guide track.

36. The measuring arrangement in accordance with claim 30, wherein said extended part extends between said mounting base and said support body.

37. The measuring arrangement in accordance with claim 30, further comprising an insertion heel provided on said mounting base for easing movement of said connector to said connecting point.

38. The measuring arrangement in accordance with claim 30, wherein said base body is fastened on said mounting base by being shifted along a guide track of said support body and said mounting base comprises a second connecting point that is assigned to a second connector of said extended part.

39. The measuring arrangement in accordance with claim 30, wherein a plug area for introducing a plug element of said base body is provided on said mounting base.

40. The measuring arrangement in accordance with claim 30, wherein said base body comprises a snap-in element snapped into a snap-in opening of said mounting base and wherein a snap-in point for snapping in said snap-in element is provided on said mounting body.

41. The measuring arrangement in accordance with claim 40, wherein said snap-in element comprises a snap-in lever that is snapped into said snap-in opening.

42. The measuring arrangement in accordance with claim 30, wherein said base body comprises:
   a clamping device that clamps on said support body;
   a guide that allows said base body to be shifted along a guide track of said support body in said extension direction, wherein said guide is clamped in place on said guide track by said clamping device;
   a first blocker that defines a return stop;
   wherein an actuator is provided on said base body, said actuator actuates said clamping device, which acts on a clamping element of said clamping device; and
   wherein a second blocker is provided at said actuator, said second blocker works together with said first blocker so as to limit a return movement of said actuator.

43. The measuring arrangement in accordance with claim 30, wherein said base body comprises:
   a clamping device that clamps on said support body;
   a guide that allows said base body to be shifted along a guide track of said support body in said extension direction, wherein said guide is clamped in place on said guide track by said clamping device;
   a snap-in element;
   wherein an actuator is provided on said base body, said actuator actuates said clamping device, which acts on a clamping element of said clamping device, wherein snap-in points are provided on said actuator for arresting said actuator at different positions, each of which corresponds to a different state of said clamping device which is actuated by said actuator; and
   wherein said snap-in element snaps into said snap-in points.

44. The measuring arrangement in accordance with claim 30, wherein a guide track of said support body comprises a guide to which said securing device can be clamped.

45. The measuring arrangement in accordance with claim 44, wherein said support body comprises a second guide that extends parallel with said first guide in order to fix a position of said securing device in a plane defined by said first and second guides transversely to said extension direction.

* * * * *